June 26, 1934.  J. L. ANDERSON  1,964,701

WELDING APPARATUS

Original Filed Nov. 15, 1930

INVENTOR
James L. Anderson
BY
ATTORNEY

Patented June 26, 1934

1,964,701

UNITED STATES PATENT OFFICE 1,964,701

WELDING APPARATUS

James L. Anderson, Closter, N. J., assignor to Air Reduction Company, Incorporated, New York, N. Y., a corporation of New York Original application November 15, 1930, Serial No. 495,920. Divided and this application October 10, 1933, Serial No. 692,973

5 Claims. (Cl. 158—27.4)

This invention relates to oxyacetylene and similar heating torches and has particular reference to torches used in welding the seams of spirally wound pipe. The invention is intended for welding helical seams according to the method disclosed and claimed in my copending application Serial No. 495,920, filed November 15, 1930, of which this application is a division.

In machine welding of pipe or tubing, a seam-wise-extended system of oxy-fuel flames are delivered against the metal on opposite sides of the seam cleft to fuse the abutting edges and cause them to flow together to make a fusion weld. The flames are ordinarily delivered from a single torch having one or more rows of orifices for delivering successive jets against the tube as it moves with respect to the torch.

The oxyacetylene torch is customarily used for fusion welding by flame heating, and it has been found that such welding operations are most efficient when the inner cones of the oxyacetylene flame jets are properly spaced from the tube and directed substantially perpendicularly toward the surface of the tube.

When welding straight-line seams, the flame jets are easily directed against the metal so as to obtain highly efficient results. In welding other than straight-line seams which are not disposed in the same plane throughout, the tip used for straight-line welding has previously been applied with relatively inefficient and uneconomical results. When such a tip is used for welding the helical seam of a spirally wound pipe, most of the flame jets are not properly spaced from the pipe surface; they are directed at various angles to the surface of the pipe; and some of the flame jets may strike the molten metal at such angles that they will drive the metal down the sloping portion of the pipe surface.

It is an object of this invention to provide an improved welding torch and method of making such a torch, for efficiently welding non-rectilinear seams, no parts of which lie in the same plane, such as the helical seam of a spirally wound pipe.

The invention has particular application to those operations in which welding of seams is substantially continuous and progressive, relative motion of the flame jets and work being effected by feeding the pipe past a stationary torch. My improved torch is shaped to space all of the jet orifices at the proper distance from the surface of the pipe and the orifices are disposed so that when the torch is properly positioned with respect to the seam each flame jet is directed toward the pipe surface at the most desirable angle. The positions of all of the flame jets can be simultaneously controlled by moving the torch to bring the jet orifices within a uniform effective distance from the seam.

Other objects, features and advantages of the invention will appear or be pointed out as the description proceeds.

In the accompanying drawing, forming a part hereof:

Figure 1:
Fig. 1 is a plan view of a spirally wound pipe with a torch embodying this invention in position to weld the helical seam.
Figure 2:
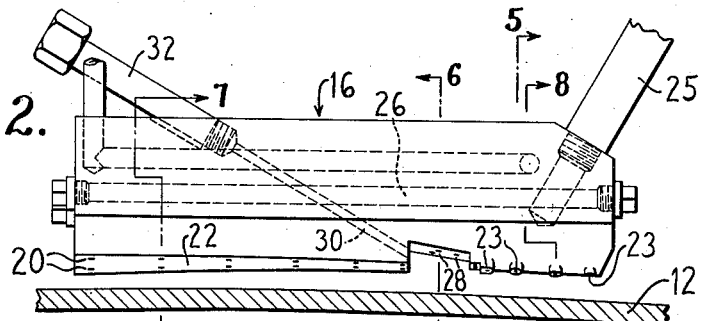
Fig. 2 is an enlarged side elevation of the torch of Fig. 1, with a portion of the pipe shown in section.
Figure 3:
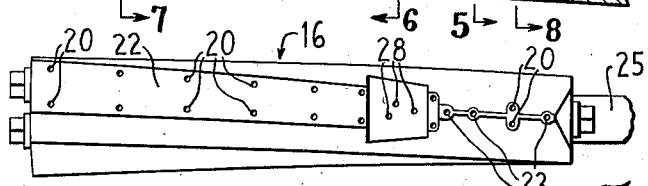
Fig. 3 is a bottom plan view of the torch shown in Fig. 2.
Figure 4:
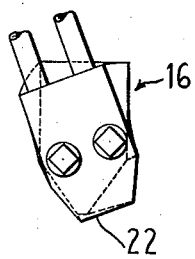
Fig. 4 is an end elevation showing the front end of the torch.
Figure 5:
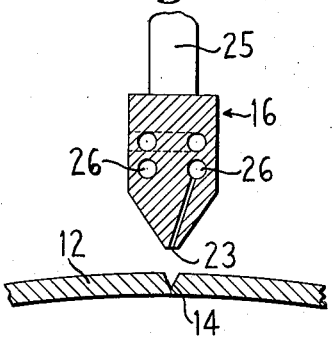
Figs. 5–8 are sectional views on the lines 5—5 to 8—8, respectively, of Fig. 2.
Figure 6:
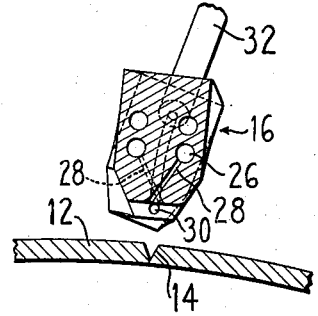
Figure 7:
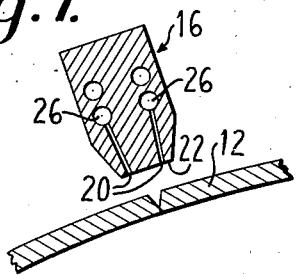
Figure 8:
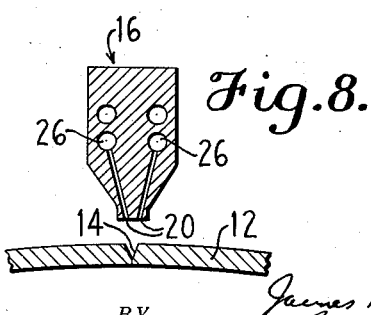

A pipe 12 is formed by winding sheet metal into a spiral, with the edges of the sheet metal meeting along a helical seam 14. A burner or torch tip 16 is located in position to direct flame jets at the metal of the seam margins to fuse the metal and weld the seam edges together.

Flame jet orifices 20 in the bottom face 22 of the torch tip are spaced as in my Patent No. 1,516,486, dated November 25, 1924, in which rows of flames are directed so that they impinge substantially perpendicularly against the surface of the metal, not directly upon or between the seam edge faces but somewhat back from the seam edges, for the purposes set forth in said patent. Some of the flame jet orifices 23 are located in position to direct their jets directly against the pool of molten metal near the rearward end of the torch.

Since the helical seam 14 is not in a plane, it is necessary to bend and/or twist the body of the tip in order to position the jet orifices 20 so that they direct their flame jets against the metal along opposite sides of the seam, in accordance with the plan in my aforesaid patent.

In order to locate the jet orifices 20 so that the flame jets are properly spaced from the pipe surface and are directed substantially perpendicularly toward the surface, it is necessary that the face 22 be curved or twisted so that it is practically concentric with the surface of the pipe.

The torch tip is supported by a stem 25, through which gas is supplied to the chambers 26 for discharge through the jet orifices 20 and 23.

A portion of the tip face is cut out and has jet orifices 28 for directing flame jets against a wire which is fed through a passage 30 when metal is to be added to the weld. The passage 30 extends through the torch from a pipe 32.

The tip of this invention is made from a plane face tip of the type shown in said patent by subjecting such tip to a bending and twisting by means of suitable rollers or dies which twist the torch both laterally and vertically. The particular shape of the torch is determined by the pitch and radius of the seam to be welded. Although the drilling of the jet orifices can be done after the bending and twisting operation, it is preferable to drill the jet orifices and wire passage in the straight-bodied tip before the body is subjected to bending stress.

The tip body is then bent substantially uniformly throughout, and the jet orifices positioned along a predetermined seam line. The twisting of the tip body brings the jet orifices into position to direct the flames perpendicularly toward the pipe surface. Slight imperfections or deviations in the jet orifices, produced by the bending and twisting operation, can be corrected by redrilling when necessary. The usual drills for forming the orifices can be used for this purpose.

The preferred embodiment of the invention has been described, but changes and modifications may be made, and various features of the invention used alone or in combination with other features, without departing from the invention as defined in the claims.

I claim:

1. A welding torch having a body portion with a helically shaped face, and jet orifices opening through the face in positions to produce a series of flame jets, the effective portions of which follow a helical path, said orifices directing their respective flame jets so that each jet is substantially perpendicular to the helical path formed by the effective portions of the jets.

2. In welding apparatus, a torch tip having a body portion, and an orifice face on said body portion having a plurality of jet orifices therein, said orifices being directed in such manner, and said face being helically shaped so as to produce a series of flame jets, the effective portions of which follow a helical path.

3. A torch tip for welding the helical seam of spirally wound pipe, said tip having a body portion with a bottom face which follows the curve of the pipe surface adjacent the helical seam, and means for directing a helically extending system of flame from the bottom face of the torch tip against the pipe.

4. In welding apparatus, a torch tip having a body portion with a plurality of jet orifices opening therefrom, a gas chamber in the torch for supplying gas to the jet orifices, said jet orifices being directed at their discharge ends to cause the jets which issue from them to impinge upon the margins of a helical seam at substantially uniform angles with the seam.

5. In welding apparatus, a torch tip having a plurality of jet orifices opening from its bottom face, said face being formed to follow a helical seam and said orifices being located in position and directed to make their flame jets impinge at substantially uniform angles upon the margins of a helical seam.

JAMES L. ANDERSON.